Nov. 24, 1931.  F. SIEBER  1,833,233
VACUUM MEASURING INSTRUMENT
Filed May 13, 1926
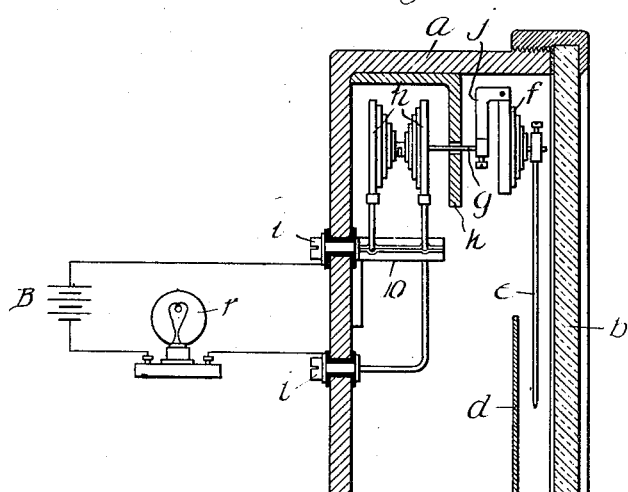
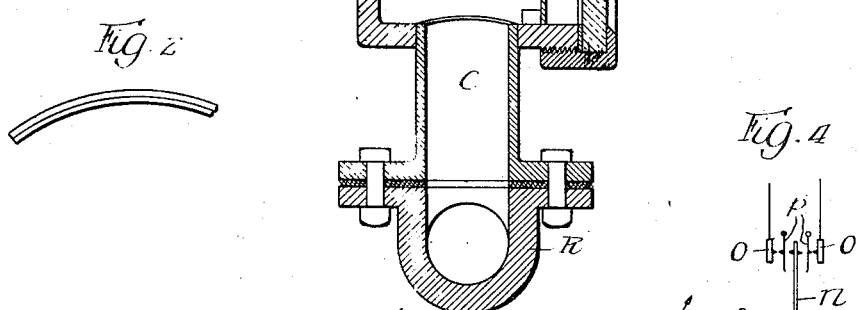
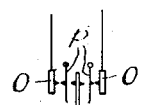
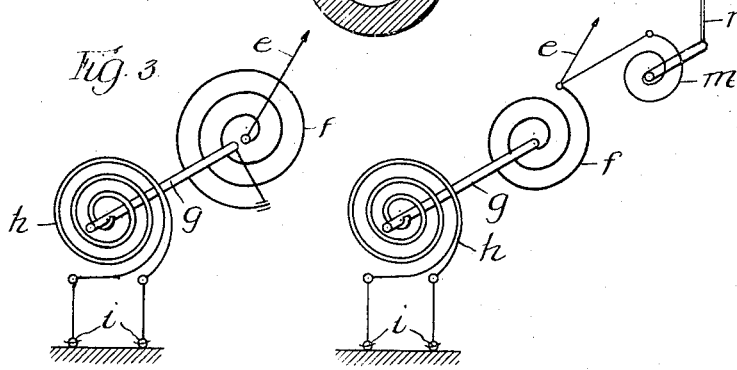
Inventor
Fritz Sieber Patented Nov. 24, 1931

1,833,233

UNITED STATES PATENT OFFICE

FRITZ SIEBER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

VACUUM MEASURING INSTRUMENT

Application filed May 13, 1926. Serial No. 108,726.

This invention relates to devices for the measurement, indicating and detection of vacuum. It is of the type of such devices known generally as the hot wire type which depend for their action upon the variation of diffusion of heat from a heated wire or the like incident to variation of the density of the surrounding atmosphere. The present invention is designed with particular reference to the requirements of metallic vapour rectifiers and similar vacuum apparatus which is employed industrially.

The general object of the invention is the provision of a device of the type designated, which is very simple, compact and strong in construction, yet very sensitive, accurate and quickly responsive in operation.

An important object of the invention is the provision of a device of the sort designated, from which direct readings may be made, the unitary gauge thus functioning as both a detecting and indicating instrument.

A more specific object is the provision of a device in which temperature changes to which it is subjected, other than those resulting from the vacuum changes to be detected, are compensated for in a simple manner.

Another specific object is the provision of a device having the characteristics designated, which may be employed for the operation of relays, switches or the like, from which the operation of the vacuum pump may be controlled.

Other and further objects will be pointed out or indicated hereinafter, or will be obvious to one skilled in the art upon consideration of the invention.

In the drawings forming a part of this specification is shown one form of device embodying the invention, but the claim is not to be construed as limited to this structural form only.

In the drawings,

Fig. 1 is a sectional elevation of a gauge taken on a vertical diameter, ancillary portions being shown diagrammatically;

Fig. 2 is an enlarged detail showing an edge view of a part of the composite temperature responsive coils.

Fig. 3 is a diagram of the operating parts of the device shown in Fig. 1, and

Fig. 4 is a similar diagram of a modified form of device which may be arranged for operating electric contacts or the like.

Hot wire vacuum gauges utilize the heat-diffusing capacity of the atmosphere whose density is to be measured as a factor for controlling their operation. As the variations of the heat-diffusing capacity of the rarified atmosphere, which usually is kept as near vacuum as possible, are quite small, some sort of amplifying indicating device is usually necessary to magnify their effect on the detecting instrument, in order that they may be ascertained, either visually or mechanically. The present invention obviates any necessity for such appurtenances as well as damping arrangements and counterpoises for the indicating element.

The nature of the invention may be ascertained by reference to the example illustrated. In the drawings, $a$ designates the casing of the instrument, closed hermetically at the front with a glass panel $b$, and having a connection $c$ with the vacuum line or container R. In the casing is the calibrated dial $d$ visible through the glass. On a bracket 10 is mounted a composite double spiral $h$, formed of a coiled strip of metals having different temperature coefficients joined after the usual fashion of such elements, as illustrated in Fig. 2, the inner ends of the two coils being joined and supporting a spindle $g$. The outer ends of the coiled strips are connected respectively to the terminals $i$ leading through the casing. The spindle $g$ carries an arm $j$ extending radially, and to the outer end of this arm is connected the outer end of the compensating temperature responsive coil $f$, which is a spiral wound in the counter-direction to the spirals $h$. The inner end of the spiral $f$ carries a spindle in alignment with the spindle $g$, and on the same is mounted the pointer $e$ which extends into indicating relationship with the dial $d$. The terminals $i$ are connected to a source B of continuous electrical current of constant voltage through a suitable current equalizing element such as the resistance $r$ composed of iron wire in an atmosphere of hydrogen, whereby the current is maintained practically constant. The spindle $g$ leads through a partition or shield $k$ interposed between the elements $h$ and $f$, to protect the latter from heat radiation from the former. The constructions of the coils $h$ and $f$ are such that they respond in equal degree to temperature variations.

In the operation of the device, the current from source B heats the coil $h$, the resulting expansion of the latter varying in accordance with the rapidity with which heat is abstracted from it by the surrounding atmosphere, the greater the density of the latter, the less will be the amount of heat effective in $h$ to change its form. Expansion or contraction of the actuating coil $h$ will be effective to rotate the spindle $g$, the changes of position being indicated by pointer $e$ in relationship to dial $d$, which may be suitably calibrated to read in degrees of vacuum. Due to the shield $k$, the compensating coil $f$ is not subject to the heating by the current from source B, as is coil $h$, but it is subject to the same atmospheric temperature, and as it acts in the counter direction on pointer $e$, it fulfills its purpose of compensating the effect of the atmospheric temperature on coil $h$, so that the indicating position of pointer $e$ will represent the determinative heat differential of coil $h$.

Owing to the considerable torque developed by the compound strip system, the instrument may be fitted with limit contacts, as shown on Fig. 4, which operate an electric alarm or protective circuit when an upper or lower limit of vacuum is reached. The moving system comprising the hot spiral $h$, the compensating spiral $f$, and the pointer $e$ is then extended by adding a weak spring $m$ carrying a contact arm $n$ which is effective to close the contacts $p$ upon the fixed contacts $o$. As long as the arm $n$ does not make contact, the system acts as though the spring $m$ did not exist, but beyond these limits the weak torque of the spring $m$ opposes the deflecting torque of the instrument and thus the graduations on the outer portions of the scale will be somewhat closer together. If the position of the contacts $o$ is definitely fixed, this correction may of course be incorporated in the scale and no subsequent correction of the reading will be necessary.

What I claim is:—

In vacuum-measuring apparatus, a casing, means providing for connection of said casing with a vacuum line, an indicating element disposed within said casing, means operable to impart indicating movement to said element in a given direction and in amount substantially directly proportional to temperature conditions in said casing, and means operable to impart indicating movement to said element in the direction opposite to said given direction and in amount substantially directly proportional to temperature conditions in said casing, and means for maintaining through said last-named means substantially continuous flow of electric current at substantially constant voltage.

In testimony whereof I have hereunto subscribed my name at Zurich, Switzerland, on the 18 day of March, A. D. 1926.

FRITZ SIEBER.